United States Patent
Li et al.

(10) Patent No.: US 8,897,696 B2
(45) Date of Patent: Nov. 25, 2014

(54) METHOD AND APPARATUS OF USING A RELAY STATION TO ASSIST PROCESSING OF REQUESTS FROM USER ENDS

(75) Inventors: Hui Li, Beijing (CN); Ping Li, Shanghai (CN); Tao Liu, Beijing (CN); Yi Sheng Xue, Beijing (CN); Dan Yu, Beijing (CN); Wolfgang Zirwas, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1371 days.

(21) Appl. No.: 12/312,124

(22) PCT Filed: Oct. 25, 2007

(86) PCT No.: PCT/EP2007/061483
§ 371 (c)(1),
(2), (4) Date: Jan. 26, 2010

(87) PCT Pub. No.: WO2008/049889
PCT Pub. Date: May 2, 2008

(65) Prior Publication Data
US 2010/0130193 A1    May 27, 2010

(30) Foreign Application Priority Data
Oct. 25, 2006   (CN) .......................... 2006 1 0137449

(51) Int. Cl.
| | |
|---|---|
| *H04B 7/15* | (2006.01) |
| *H04B 7/14* | (2006.01) |
| *H04B 7/00* | (2006.01) |
| *H04W 28/08* | (2009.01) |
| *H04W 84/04* | (2009.01) |
| *H04B 7/26* | (2006.01) |
| *H04W 72/04* | (2009.01) |

(52) U.S. Cl.
CPC ............ *H04W 28/08* (2013.01); *H04W 84/047* (2013.01); *H04B 7/2606* (2013.01); *H04W 72/0406* (2013.01)
USPC ............... 455/11.1; 455/509; 455/507; 455/7

(58) Field of Classification Search
CPC ........................... H04B 7/15542; H04B 17/02
USPC .......................................... 455/7, 9, 11.1, 16
See application file for complete search history.

(56) References Cited

U.S. PATENT DOCUMENTS

| | | | |
|---|---|---|---|
| 4,882,765 A | 11/1989 | Maxwell et al. | |
| 6,141,533 A * | 10/2000 | Wilson et al. | ................ 455/11.1 |

(Continued)

FOREIGN PATENT DOCUMENTS

WO    2004/002082 A1    12/2003

OTHER PUBLICATIONS

Kevin Baumann et al., Transparent Uplink Relaying for OFDMA: Internet Citation; IEEE 802.16 Broadband Wireless Access Working Group; Nov. 4, 2004, XP002419889, p. 6.

*Primary Examiner* — Tilahun B Gesesse
(74) *Attorney, Agent, or Firm* — Harrington & Smith

(57) ABSTRACT

A method uses a relay station to assist processing of requests from user ends. The relay station acquires and monitors channel resource information received from a base station. Upon receiving a request from the UEs via the channel resource, the relay station sends the request received to the base station if it detects no response from the base station to the request. An apparatus uses a relay station to assist processing of requests from UEs. A channel resource acquisition unit acquires channel resource information from the base station. A user monitoring unit monitors the channel resource acquired by the channel resource acquisition unit and for receiving requests sent from the UEs. A base station monitoring unit monitors response from the base station to the requests upon receiving the requests sent from the UEs. A transmitting unit sends the request to the base station when no response from the base station to the request is detected.

20 Claims, 3 Drawing Sheets

(56) References Cited

U.S. PATENT DOCUMENTS

| | | |
|---|---|---|
| 7,065,364 B1 | 6/2006 | Todd |
| 7,373,103 B2 * | 5/2008 | Sato et al. ............... 455/7 |
| 7,760,678 B2 * | 7/2010 | Sandhu et al. ............ 370/315 |
| 7,853,202 B1 * | 12/2010 | Visotsky et al. ............ 455/9 |
| 7,929,988 B2 * | 4/2011 | Horiuchi et al. ............ 455/550.1 |
| 8,018,893 B2 * | 9/2011 | Sartori et al. ............ 370/329 |
| 8,364,075 B2 * | 1/2013 | Adam et al. ............... 455/7 |
| 8,611,291 B2 * | 12/2013 | JI et al. ............... 370/329 |
| 2002/0187746 A1 * | 12/2002 | Cheng et al. ............ 455/11.1 |
| 2005/0048914 A1 * | 3/2005 | Sartori et al. ............ 455/11.1 |
| 2010/0002582 A1 * | 1/2010 | Luft et al. ............ 370/230.1 |
| 2010/0142415 A1 * | 6/2010 | Yu et al. ............ 370/279 |
| 2011/0149769 A1 * | 6/2011 | Nagaraja ............ 370/252 |
| 2011/0208825 A1 * | 8/2011 | Lee et al. ............ 709/206 |
| 2012/0015662 A1 * | 1/2012 | Zhang et al. ............ 455/445 |
| 2012/0058759 A1 * | 3/2012 | Lundborg et al. ............ 455/424 |

* cited by examiner

METHOD AND APPARATUS OF USING A RELAY STATION TO ASSIST PROCESSING OF REQUESTS FROM USER ENDS

CROSS REFERENCE TO RELATED APPLICATIONS

This application is based on and hereby claims priority to PCT Application No. PCT/EP2007/061483 filed on Oct. 25, 2007 and Chinese Application No. 200610137449.8 filed on Oct. 25, 2006, the contents of which are hereby incorporated by reference.

BACKGROUND

The present invention relates to a method and apparatus of using a relay station to assist processing of requests from user ends (UEs).

In a cellular mobile radio communication system, when a base station has a very high covering capability and very large coverage, there may be the following problem: when a user end is at the edge of the coverage of the base station, the signal received by the base station from the user end will have a poor quality due to relatively low transmitting power of the user end and even worse the signal sent from the user end cannot be received properly.

A solution to this problem is to add a relay station (RS) in the area covered by the system. By adding a relay station in the radio cellular system to develop a multi-hopping capability, it will not only extend the covering area of the system and cell capability but also will have such advantages as reduced transmitting power of user ends and prevention of serious shadow areas. The solution of adding a relay station in a cellular mobile radio communication system has been widely adopted in the art and FIG. 1 is a diagram illustrating the architecture of a cellular mobile radio communication system with a relay station.

When the relay station is added to the cellular system, an overall planning of the system can be made as well. A feasible solution is to build a cellular system controlled by a base station. The concept is that the base station sends signaling to all user ends and responds to requests sent from individual user ends. To do this, how the relay station is used to assist end users and to forward the uplink requests of the end users to the base station is a significant challenge. Recently, there is emerging attention to how a relay station can be added to a cellular mobile radio communication system and studies of how the relay station can be used to forward the uplink requests from the user ends have started.

A method for using a relay station to forward uplink requests of end users in a cellular mobile radio communication system is that the relay station will not process the uplink requests received from the user ends but will immediately send the uplink requests received to the base station upon receipt.

The shortcoming of this method is that when the relay station receives a large number of uplink requests from the user ends, the need of immediate forwarding of all uplink requests received to the base station will result in forwarding of large number of messages at the same time, which will greatly increase the load on the relay station. In addition, the direct forwarding of uplink requests by the relay station will greatly increase the frequency at which the radio resources between the relay station and the base station are used, leading to waste of system radio resources, in particular when there are a large number of relay stations in the coverage of the base station, which may even exhaust the radio resources.

SUMMARY

In view of these, one potential object is to provide a method and apparatus of using relay stations in a cellular mobile radio communication system to assist processing of requests from user ends. This will not only reduce the operation load on the relay stations, and thus saving in system radio resources, but also will reduce operation load on the base station, cut the system response time and further improve system performance and efficiency through the assistance that can be provided by the relay stations to the base station.

Therefore, the inventors propose the following technical solution:

a method of using a relay station to assist processing of requests from user ends, comprising:

relay stations acquiring channel resource information from the base station and monitoring the channel resource;

upon receiving a request sent from a UE via the channel resource, the relay station sending the received request to the base station if it detects no response from the base station to the request;

wherein the relay station determines whether the base station responds to the request using the following steps:

the relay station starts the timer upon receiving the request and monitors whether the base station responds to the request; if the base station does not respond to the request within a preset time, the relay station determines that the base station does not respond to the request;

wherein the base station sets the preset time and notifies the relay station;

wherein the base station sets the preset time based on its capability of directly covering the area in the vicinity of the relay station and the preset time is smaller if the base station's coverage capability is greater;

wherein the base station sets the preset time based on the radio resources available for communication between itself and the relay station and the preset time is smaller if there are more radio resources;

wherein the base station sets the preset time based on the requested responding time and the preset time is smaller if the requested responding time is shorter;

wherein the base station sets the preset time based on its processing capability and load and the preset time is smaller if the base station has a greater processing capability or a smaller load;

wherein the base station sets the preset time based on the processing capability and the load of the relay station and the preset time is smaller if the relay station has a greater processing capability or a smaller load;

wherein the relay station determines whether the base station responds to the request using the following steps:

the relay station determines that the base station responds to the request if it detects a response from the base station to the request or detects a preset indication message sent from the base station; otherwise, the relay station determines that the base station does not respond to the request;

wherein the relay station acquires the channel resource information from the base station using the following steps:

the base station sends the channel resources that it allocates to the UE through a broadcast message;

the relay station receives the broadcast message and acquires the channel resource information of the UE;

wherein the steps further comprise:
upon receiving the request from the UE, the relay station measures transmitting parameters of the UE and sends the acquired transmitting parameters along with the request to the base station;
wherein the transmitting parameters of the UE comprise at least one of transmitting power, carrier frequency and time-slot information.

Based on the method described above, the inventors propose an apparatus of using relay stations to assist processing of requests from user ends, comprising:
a channel resource acquisition unit for acquiring channel resource information from a base station;
a user monitoring unit for monitoring the channel resource acquired by the channel resource acquisition unit and for receiving requests sent from the UE;
a base station monitoring unit for monitoring responses from the base station to the requests once the requests are received from the UE;
a transmitting unit for sending the requests to the base station if no response from the base station to the requests is detected;
wherein the base station monitoring unit comprises a timer unit, a monitoring unit and a notifying unit:
the timer unit is used to start clocking once the user monitoring unit receives a request from a UE and to stop clocking when the monitoring unit detects a response from the base station to the request or when the preset time is out;
the monitoring unit is used to monitor whether the base station responds to the request once the timer unit starts clocking;
the notifying unit is used to monitor both the timer unit and the monitoring unit and to notify the transmitting unit to send the request if the monitoring unit does not detect a response from the base station within the preset time;
wherein the base station sets the preset time and notifies the timer unit;
wherein the monitoring unit comprises:
a response monitoring unit for monitoring a response from the base station to the request;
a message monitoring unit for monitoring a preset indication message sent from the base station;
a determining unit for monitoring both the response monitoring unit and the message monitoring unit and determining that the base station responds to the request if the response monitoring unit detects a response from the base station to the request or the message monitoring unit detects a preset indication message sent from the base station; and otherwise, determining that the base station does not respond to the request and sending the determination result to the notifying unit;
Wherein the apparatus further comprises:
a measuring unit for measuring the transmitting parameters of the UE when the user monitoring unit receives the request from the UE;
an adding unit for notifying the transmitting unit of the transmitting parameters acquired by the measuring unit to allow the transmitting unit to send the transmitting parameters along with the request to the base station.

The relay station will monitor the channel resource after it receives the channel resource information from the base station. When the relay station receives a request from a user end via the channel resource, it will monitor whether the base station responds to the request. If the relay station does not detect a response from the base station to the request, it will send the received request to the base station. From this we can see that the relay station does not immediately forward the uplink request to the base station upon receipt of the request but will monitor the base station instead. Only when the relay station does not detect a response message sent from the base station, indicating the base station has not received the uplink request from the UE, will it forward the request to the base station. In this way, the operation load of the relay station is reduced and more importantly the system radio resources are saved. The inventors propose a method and apparatus wherein the relay station measures the transmitting parameters of the UE while receiving the request from the UE and will send the transmitting parameters along with the request to the base station. As a result, the system radio resources are saved and the relay stations can be used to assist the base station to reduce the operation load of the base station, cut the system responding time and further improve the system performance and efficiency.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
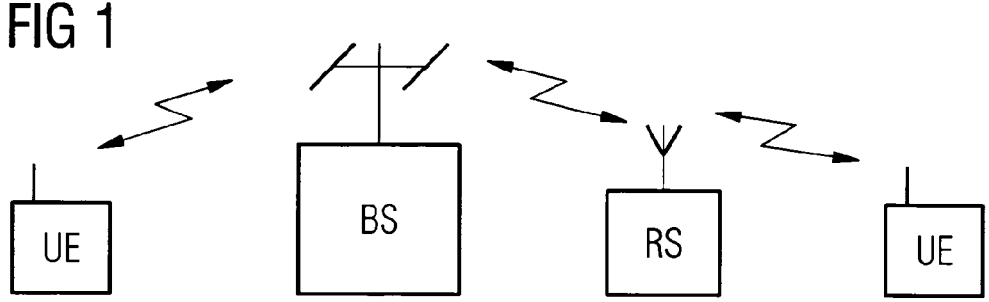
FIG. 1 is a diagram illustrating the architecture of a cellular mobile radio communication system with relay stations.

Reference will now be made in detail to the preferred embodiments of the present invention, examples of which are illustrated in the accompanying drawings, wherein like reference numerals refer to like elements throughout.

The soul of the proposals lies in the concept that when the relay station receives a request from a user end through the channel resource it monitors, it will not send the request to the base station immediately but will wait for a response message from the base station. When the relay station receives the response message to the request from the base station within the preset time, it realizes the base station has received the request and will not send the request to the base station again. If the relay station does not receive a response message to the request from the base station within the preset time, it realizes that the base station has not received the request and will send the request to the base station.

Figure 2:
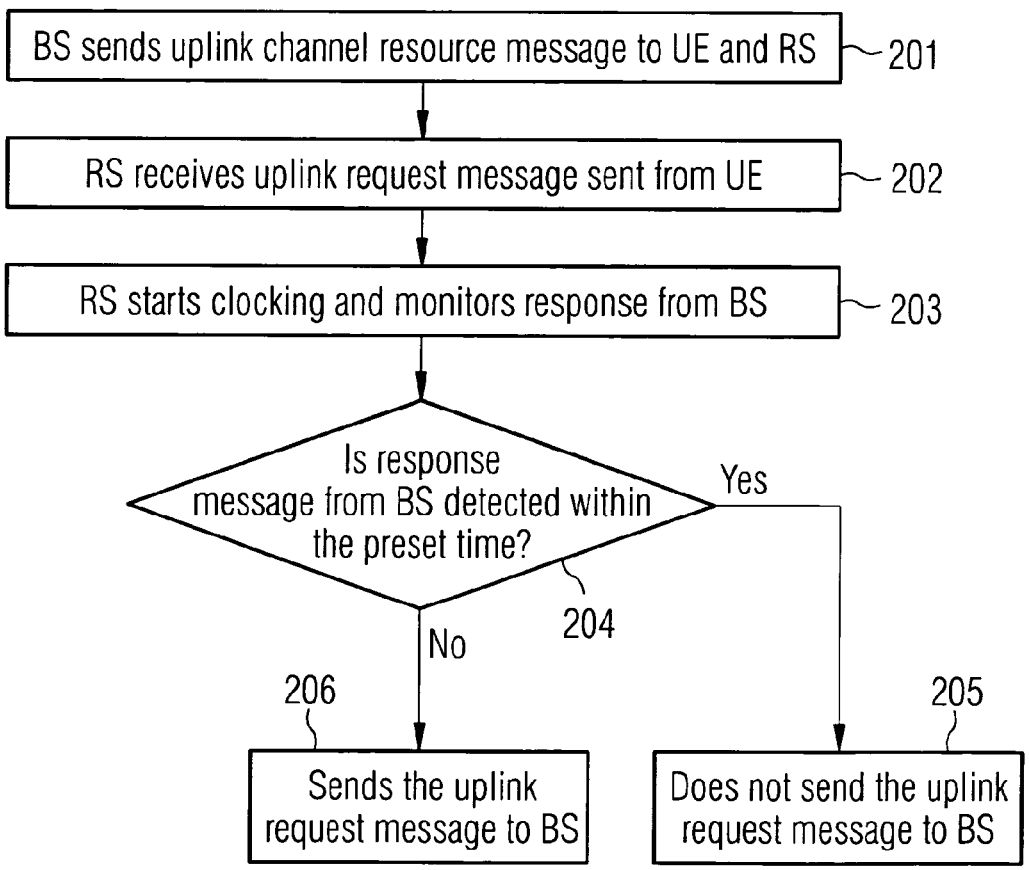
FIG. 2 is a flowchart showing an embodiment of the proposed method.

The method will be further described in combination with embodiments and FIG. 2 is a flowchart of the method.

After allocating the uplink channel resource to the UE in step 201, the base station sends the uplink channel resource it allocates through a broadcast message. The relay station will be notified of the uplink channel resources to be used by individual user ends through broadcast messages sent from the base station and will monitor the uplink channel resources notified by the base station.

The base station allocates the uplink channel resource to a user end and the user end is notified of the uplink channel resource allocated to it and will send a relevant uplink request through the relevant channel resource. The relay station is able to receive the uplink request sent from the user end by monitoring the uplink channel resource notified by the base station.

Wherein the uplink channel resources comprise time-slot resource, carrier resource and modulation/coding methods.

When the user end sends the uplink request to the base station through the uplink channel resource allocated by the base station, as in step 202, the uplink request will be received by the relay station.

The relay station does not send the uplink request to the base station immediately upon receipt of the uplink request of the user end from the uplink channel resource that it monitors but will start the timer and monitor the response of the base station as in step 203. The relay station decides whether or not to send the uplink request received to the base station based on how the base station responds.

Once the timer is started, the relay station will determine whether a response message is sent from the base station within the preset time $T_{help}$ as in step 204, that is, whether a response message to the request is received from the base station. If, within the preset time $T_{help}$, a response to the uplink request sent from the user end is received from the base station, indicating the base station has received the uplink request sent from the user end, the relay station will execute step 205, that is, does not send the uplink request to the base station again. If, within the preset time $T_{help}$, no response to the uplink request sent from the user end is received from the base station, indicating the base station has received the uplink request sent from the user end, the relay station will execute step 206, that is, sends the uplink request to the base station.

Figure 3:
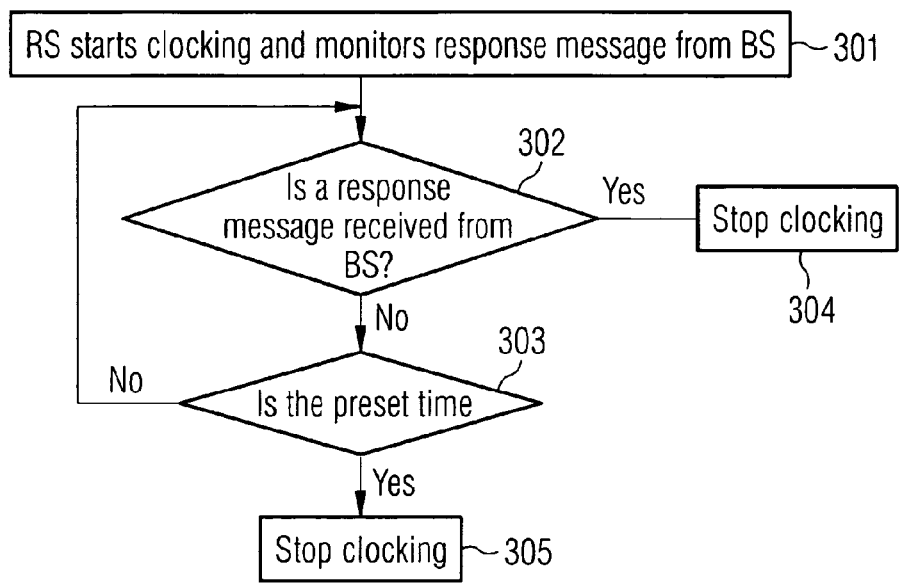
FIG. 3 is a flowchart illustrating how the relay station determines whether the response message is received from the base station within the preset time.

A method for the relay station to determine whether response from the base station to the request is received with the preset time $T_{help}$ is shown in FIG. 3.

At step 301, the relay station will start the timer and monitor the response message from the base station upon receiving the request from the user end, and at step 302, will enquire about whether a response to the request is received from the base station, and if yes, at step 304, will stop the timer and determine that the base station responds to the request, indicating the base station has received the request. Otherwise, at step 303, the relay station will determine whether the preset time $T_{help}$ is out, and if yes, at step 305, will stop the timer and determine that the base station has not responded to the request, indicating the base station has not received the request; otherwise, will continue to execute step 302.

In actual operation, the base station's response to the request of the user end may some time be delayed, leading to same delay in the clocking of the relay station, and thus increasing the clocking load at the relay station site. To reduce the load on the relay, the base station may immediately send an express indication message upon receiving the request from the user end to notify the relay station that the request is received. Once the indication message is received from the base station within the preset time, the relay station will immediately stop the timer and realize the base station has received the request from the user end, thus reducing the time delay and hence reduced clocking load of the relay station. The base station may determine whether or not to send the express indication message when appropriate, and for the relay station, it can be notified of the receipt of the request from the base station by the base station when it receives the express indication message or response from the base station.

In the method described above, the relay station simply sends the uplink request received to the base station meaning that the base station only forwards the uplink request. In real operation context, the relay station may also measure the transmitting parameters, including transmitting power, carrier frequency and time-slot information, of the user end when it receives the uplink request from the user end. When the relay station sends the uplink request to the base station, the transmitting parameters of the user end will be sent along with the uplink request. This allows the base station to obtain both the request and transmitting parameters of the user end, reducing the system response time and load of the base station, and in turn improving the system performance and efficiency.

After the method is described in detail, the following will further explain how the method is applied on various occasions.

The method may be used in the initial ranging process in an IEEE802.16-based cellular mobile radio communication system.

When the user end sends a code division multiple access (CDMA) code over the initial ranging channel resource determined by the base station, the initial ranging program starts. The base station uses the characteristics of the CDMA code for content resolution. When the base station successfully resolves the initial ranging request of the user end, it allocates the uplink bandwidth for the user end, indicating successful CDMA code resolution, and proceeds to the network access program at the next step. However, when the user end is at a disadvantageous location, for example a shadow attenuation area, the base station may not be able to receive the CDMA code sent from the user end, and will not respond to the initial ranging request and will not perform the subsequent operations.

The initial ranging channel resource will be monitored by the relay station once allocated by the base station. When the user end sends the CDMA code over the initial ranging channel resource determined by the base station, the relay station can receive the CDMA code sent from the user end through the ranging channel resource and will resolve the content of the CDMA code even if the base station has not received the CDMA code. The relay station will monitor the response of the base station to the initial ranging request. If the relay station finds that the request is successfully processed by the base station, it will remain silent and if not, it will send the CDMA code and its resolved content to the base station. The base station will choose and decide a relay station suitable for executing the initial ranging program for the particular user end according to the information received from the relay station. Similarly, the method may also be used in periodic ranging process, which will not repeated herein.

The method may be used in the user end network access process in an IEEE802.16-based cellular mobile radio communication system.

An important process of user end network access is that the user end adjust the radio transmitting parameters, such as transmitting power, carrier frequency and time-slot parameter, as required by the base station. If the process of adjusting the parameters for the user end can be made in a shorter time, the processing time of network process for the end user will be reduced and hence faster network access for the user end. The method can help to quicken the process of adjusting parameters by the user end, and in turn reduce the processing time of network access for the user end.

When the user end attempts to access the network, it first monitors the broadcast message from the base station to obtain information about the channel resource available. The user end sends a network access request to the base station through the relevant channel resource. If the base station can receive the request, it will respond to the request and send a response message carrying the parameter adjustment command to the user end. Upon receiving the response message, the end user will adjust the related parameters according to the parameter adjustment command carried by the message. Then the user end will again send a network access to the base station and continue to wait for a response message. The process is repeated until the transmitting parameters of the user end requesting the network access are properly adjusted and the network access program proceeds to the next step. However, when the user end is at a disadvantageous location, e.g. shadow attenuation area, the base station may not be able to receive the network access request from the user end and will not respond to the network access request. As a result, it cannot perform the subsequent operations, leading to delayed network access for the user end.

According to the method, the initial ranging channel resource will be monitored by the relay station once allocated by the base station. When the user end attempts to access a certain base station, it first obtains information about available channel resource from a broadcast message sent from the base station and then uses the channel resource allocated by the base station to send a network access request. When the user end sends the network access request to the base station, the relay station will receive the network access request through the channel resource that it monitors and measure the transmitting parameters of the user end even if the base station has not received the network access request from the user end. The relay station will monitor the response of the base station to the network access request. If the relay station finds the network access request has been successfully processed by the base station, it will remain silent and if not, it will send the transmitting parameter of the user end along with network access request to the base station. The base station will respond to the network access request and obtain the adjustment parameters according to the transmitting parameters of the user end sent from the relay station and then send a response message carrying the adjustment parameters to the user end. It can be seen that the method can reduce the responding time of the base station and quicken the process of adjusting parameters by the user end and thus reduce the time of network access for the user end.

The preset time $T_{help}$ is vital to the solution and $T_{help}$ can be used to control how the relay station handles uplink requests. For example:

When $T_{help}=0$ and if an uplink request is received by the relay station, the request will be sent to the base station immediately. If it is necessary to use the relay station to remove any shadow attenuation areas in the system or the base station has sufficient radio resources, the setting of $T_{help}=0$ can be used.

When $T_{help}=\infty$, the relay station will not be able to send the uplink request received to the base station and if it is certain that the base station can handle all uplink requests with its coverage, the setting of $T_{help}=\infty$ can be used.

When setting $T_{help}$, a plurality of factors should be considered, including the area in the vicinity of the relay station that can be directly covered by the base station, the radio resources available for communication between the base station and relay station, delay requirement for uplink request processing and operation load on the base station.

The base station may set $T_{help}$ dynamically as needed and notify the relay station of setting of $T_{help}$ and the relay station will set according to the setting of $T_{help}$ informed by the base station. The methods for setting $T_{help}$ include: the base station sets $T_{help}$ according to its capability of directly covering the area neighboring on the relay station wherein $T_{help}$ is smaller if the coverage capability of the base station is greater; the base station sets $T_{help}$ according the radio resource available for communication between itself and the relay station wherein $T_{help}$ is smaller if the available radios resources are more; the base station sets $T_{help}$ according to the responding time requested wherein $T_{help}$ is smaller if the requested responding time is shorter; the base station sets the preset time $T_{help}$ according to its own processing capability or its load wherein $T_{help}$ is smaller if the base station has greater processing capability or a smaller load; the base station sets $T_{help}$ according to the processing capability or load of the relay station wherein $T_{help}$ is smaller if the relay station has greater processing capability or smaller load.

A smaller value of $T_{help}$ will not only reduce the required responding time but also reduce the operation load of the relay station. However, a smaller value of $T_{help}$ will also increase the frequency at which the radio resources are used, which in turn makes it necessary to use more radio resources for communication between the base station and relay station. By fine tuning the setting of $T_{help}$, the processing of uplink requests at the relay station can be controlled accurately. Setting $T_{help}$ to different values will allow the relay station to send the uplink requests it receives to the base station at a different time delay.

Figure 4:
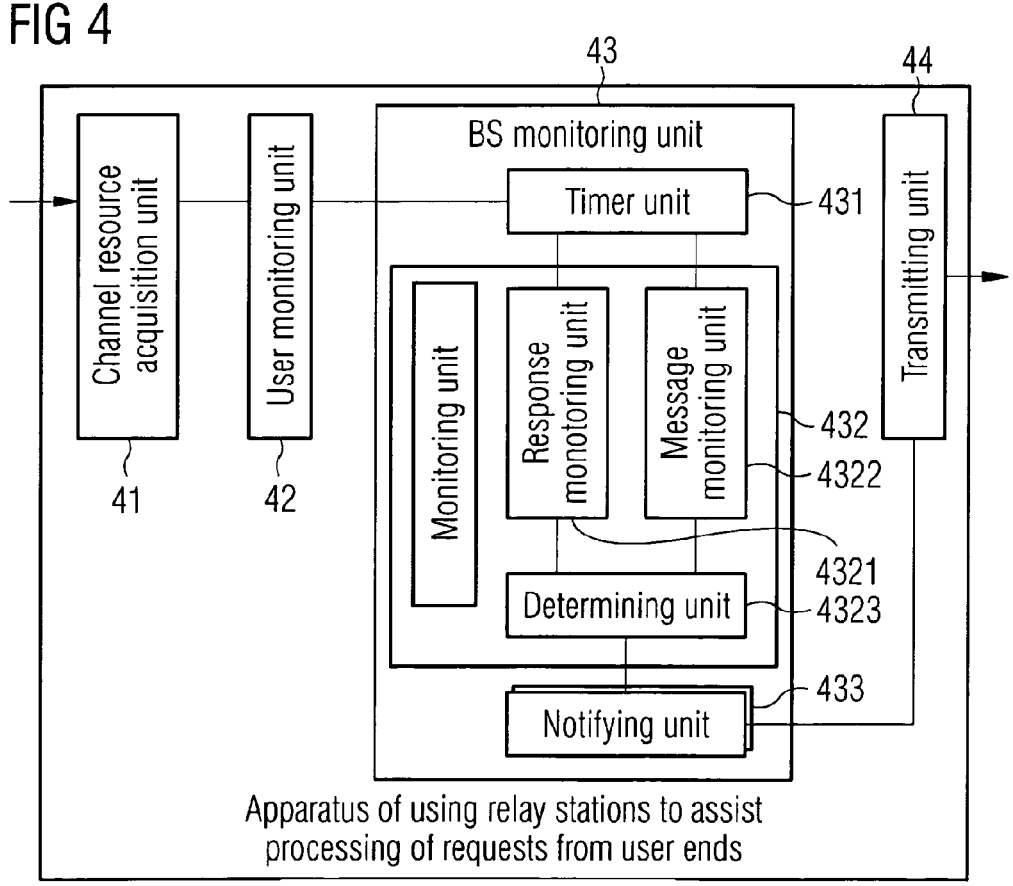
FIG. 4 is a diagram illustrating a proposed apparatus.

Based on the methods described above, the inventors further propose an apparatus of using relay stations to assist processing of requests from user ends. FIG. 4 is a schematic diagram of the apparatus, which comprises a channel resource acquisition unit 41, a user monitoring unit 42, a base station monitoring unit 43 and a transmitting unit 44, wherein the base station monitoring unit 43 comprises a timer unit 431, a monitoring unit 432 and a notifying unit 433. The monitoring unit 432 comprises a response monitoring unit 4321, a message monitoring unit 4322 and a determining unit 4323.

After allocating the uplink channel resource to the UE, the base station sends the uplink channel resource it allocates through a broadcast message. The channel resource acquisition unit 41 acquires information about the uplink channel resource to be used by the end user through the broadcast message sent from the base station. The channel resource acquisition unit 41 notifies the user monitoring unit 42 of the uplink channel resource information it acquires and the user monitoring unit 42 will monitor the channel resource and receive the uplink request sent from the user end through the channel resource, wherein the uplink channel resource comprises time-slot resource, carrier resource and modulation/coding methods.

When the user end sends the uplink request to the base station through the uplink channel resource allocated by the base station, the uplink request will be received by the user monitoring unit 42.

Upon receiving the uplink request of the user end from the uplink channel resource it monitors, the user monitoring unit 42 will trigger the base station monitoring unit 43 to monitor the base station for a response from the base station to the uplink request. If the monitoring unit 43 does not detect a response from the base station to the request, it will notify the transmitting unit 44 of the result and the transmitting unit 44 will send the request received from the user monitoring unit 42 to the base station.

Upon receiving the uplink request of the user end from the uplink channel resource it monitors, the user monitoring unit 42 will trigger the timer unit 431 in the base station monitoring unit 43 to start clocking. When the timer unit 431 starts clocking, the monitoring unit 432 also starts to monitor whether the base station responds to the request. The notifying unit 433 monitors both the timer unit 431 and the monitoring unit 432 and notifys the transmitting unit 44 to send the uplink request if the monitoring unit 432 does not detect a response from the base station to the uplink request within the preset time $T_{help}$.

Wherein the base station sets the preset time $T_{help}$ and notifies the timer unit 431.

Wherein the monitoring unit 432 monitors the response from the base station to the request through the monitoring unit 4321 and monitors the preset indication message sent from the base station through the message monitoring unit 4322, and monitors the response monitoring unit 4321 and message monitoring unit 4322 through the determining unit 4323. If the response monitoring unit 4321 detects a response of the base station to the request or if the message monitoring unit 4322 detects the preset indication message sent from the base station, the determining unit 4323 determines that the base station responds to the request and sends the determination result of response by the base station to the request to the notifying unit 433; otherwise, it determines that the base station does not respond to the request.

Figure 5:
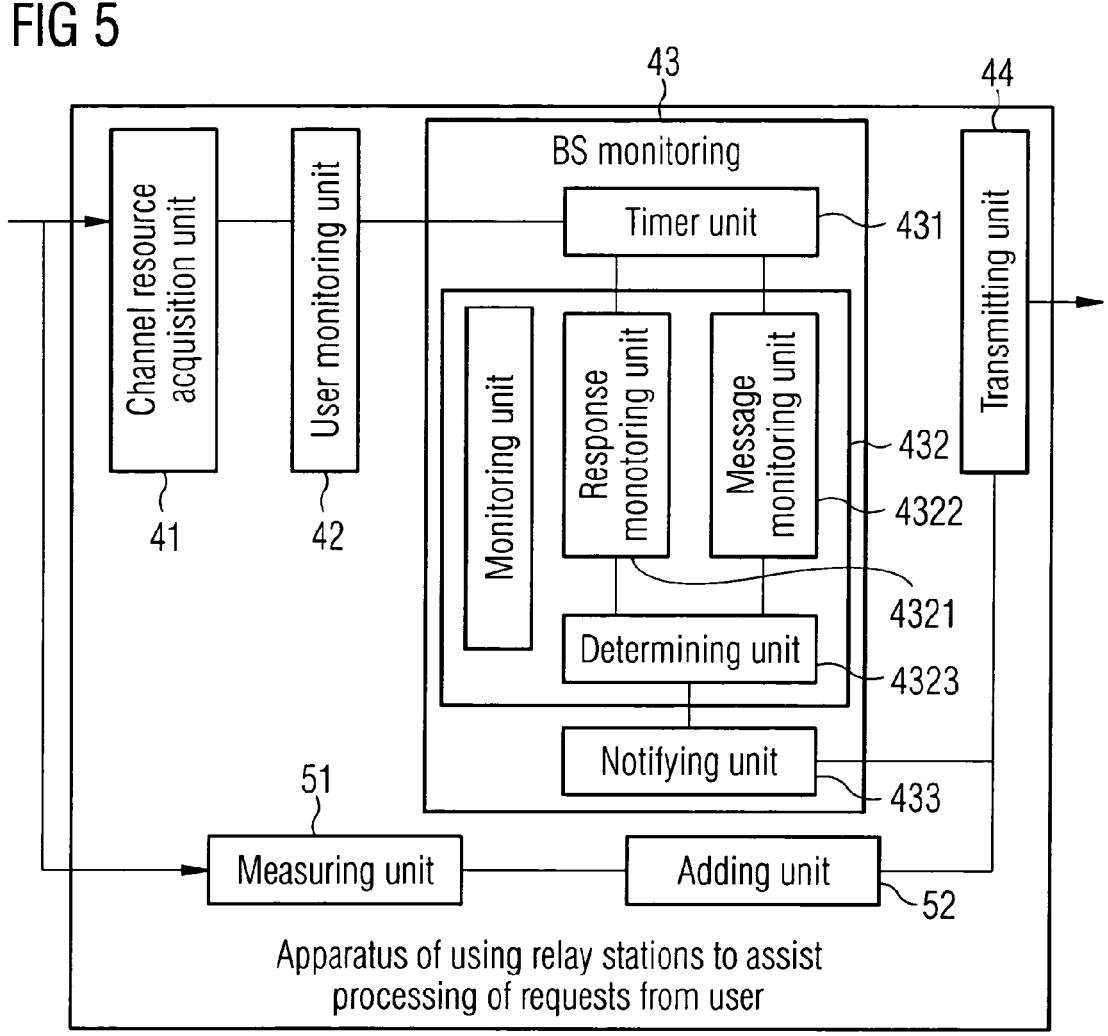
FIG. 5 is a diagram illustrating another proposed apparatus.

Based on the apparatus shown in FIG. 4, the apparatus uses relay stations to assist processing of requests from user ends as shown in FIG. 5. Compared with the apparatus shown in FIG. 4, the apparatus shown in FIG. 5 has a measuring unit 51 and adding unit 52 added.

When the user monitoring unit 42 receives the request from the user end, it can measure transmitting parameters of the user end through the measuring unit 51, which sends the transmitting parameters acquired to the adding unit 52, which in turn sends the transmitting parameters acquired by the measuring unit 51 to the transmitting unit 44. The transmitting unit 44 sends the transmitting parameters along with the request to the base station.

Compared with the existing art, the improvement is that if the relay station does not receive a corresponding message from the base station within the preset time after receiving the request from the user end through the channel resource it monitors, it will send the request received to the base station. From this we can see that, the relay station does not immediately forward the uplink request to the base station upon receipt of the request but will monitor the base station instead. Only when the relay station does not receive a response message sent from the base station, indicating the base station has not received the uplink request from the UE, will it forward the request to the base station. In this way, the operation load of the relay station is reduced and more importantly the system radio resources are saved. In the method wherein the relay station measures the transmitting parameters of the UE while receiving the request from the UE and will send the transmitting parameters along with the request to the base station. As a result, the system radio resources are saved and the relay stations can be used to assist the base station to reduce the operation load of the base station, cut the system responding time and further improve the system performance and efficiency.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method comprising:
   acquiring, by a relay station, channel resource information from a base station;
   monitoring, by the relay station, the channel resource at the relay station;
   receiving, by the relay station, via the channel resource a request sent from one of the user ends;
   monitoring, by the relay station, a response from the base station to the request once the request is received from the user end; and
   sending, by the relay station, the request to the base station in response to the relay station not detecting a response from the base station to the request within a preset time.

2. The method of claim 1, wherein the relay station determines whether the base station responds to the request by starting a timer upon receiving the request, monitoring whether the base station responds to the request and determining that the base station does not respond to the request when the base station does not respond to the request within the preset time.

3. The method as claimed in claim 2, wherein the base station sets the preset time and notifies the relay station.

4. The method as claimed in claim 3, wherein the base station sets the preset time based on a capability of the base station directly covering regions neighboring on the relay station, the greater the covering capability of the base station, the smaller the preset time.

5. The method as claimed in claim 3, wherein the base station sets the preset time based on available radio resources for communication between the base station and the relay station, the preset time being smaller when there are more available radio resources.

6. The method as claimed in claim 3, wherein the base station sets the preset time based on a requested responding time, and the preset time is smaller when the requested response time is shorter.

7. The method as claimed in claim 3, wherein the base station sets the preset time based on a processing capability or a load of the base station, and the preset time is smaller when the base station has a greater processing capability or a smaller load.

8. The method as claimed in claim 3, wherein the base station sets the preset time based on a processing capability or a load of the relay station, and the preset time is smaller when the relay station has a greater processing capability or a smaller load.

9. The method as claimed in claim 2, wherein the relay station determines that the base station responds to the request when the relay station detects a response from the base station to the request or detects a preset indication message sent from the base station and determines that the base station does not respond to the request when the relay station does not detect a response from the base station to the request and does not detect a preset indication message sent from the base station.

10. The method as claimed in claim 1, wherein the acquiring the channel resource information from the base station at the relay station includes receiving a broadcast message including channel resources that the base station allocated to the user end from the base station and acquiring the channel resource information of the user end from the broadcast message.

11. The method as claimed claim 1, further comprising:
    measuring transmitting parameters of the user end at the relay station and sending the measured transmitting parameters along with the request having been received from the user end to the base station.

12. The method as claimed in claim 11, wherein the transmitting parameters of the user end include at least one of a transmitting power, a carrier frequency and time-slot information.

13. An apparatus comprising:
a channel resource acquisition unit for acquiring channel resource information from a base station;
a user monitoring unit for monitoring the channel resource information and for receiving via the channel resource a request sent from one of the user ends;
a base station monitoring unit for monitoring a response from the base station to the request once the request is received from the user end; and
a transmitting unit for sending the request to the base station when no response from the base station to the request is detected within a preset time.

14. The apparatus as claimed in claim 13, wherein the base station monitoring unit comprises at least the following:
a timer unit for starting clocking once a request from the user end is received and stopping clocking when the response from the base station to the request is detected or when the preset time ends;
a monitoring unit for monitoring whether the base station responds to the request once the clocking has started; and
a notifying unit monitoring both the timer unit and the monitoring unit and notifying the transmitting unit for sending the request when the response from the base station is not detected within the preset time.

15. The apparatus as claimed in claim 14, wherein the apparatus is notified of the preset time by the base station.

16. The apparatus as claimed in claim 14, wherein the monitoring unit comprises at least the following:
a response monitoring unit for monitoring the response from the base station to the request;
a message monitoring unit for monitoring a preset indication message sent from the base station; and
a determining unit, monitoring both the response monitoring unit and the message monitoring unit, for determining that the base station responds to the request when a response from the base station to the request is detected or a preset indication message sent from the base station is detected, determining that the base station does not respond to the request when a response from the base station to the request is not detected and a preset indication message sent from the base station is not detected.

17. The apparatus as claimed in claim 13, further comprising at least the following:
a measuring unit for measuring transmitting parameters of the user end when the user the request from the user end is received; and
an adding unit, notifying the transmitting unit of the transmitting parameters acquired by the measuring unit, allowing the transmitting unit to send the transmitting parameters along with the request to the base station.

18. A method comprising:
transmitting channel resource information from a base station to the relay station;
monitoring, by the relay station, the channel resource at the relay station;
receiving, by the relay station, via the channel resource a request sent from a user end; and
receiving a request at the base station from the relay station when the relay station does not detect a response from the base station to the request within a preset time.

19. The method of claim 18, further comprising:
allocating channel resources to the user end;
transmitting a broadcast message including channel information regarding the allocated channel resources from the base station.

20. The method of claim 18, further comprising:
receiving transmitting parameters of the user end measured at the relay station along with the request having been received from the user end.

* * * * *